(12) United States Patent
Persson et al.

(10) Patent No.: US 12,216,197 B2
(45) Date of Patent: Feb. 4, 2025

(54) METHOD AND SYSTEM FOR DETERMINING AN ARTICULATION ANGLE OF A VEHICLE COMBINATION

(71) Applicant: Volvo Truck Corporation, Gothenburg (SE)

(72) Inventors: Daniel Persson, Gothenburg (SE); Hans Deragården, Kullavik (SE)

(73) Assignee: Volvo Truck Corporation, Gothenburg (SE)

( * ) Notice: Subject to any disclaimer, the term of this patent is extended or adjusted under 35 U.S.C. 154(b) by 294 days.

(21) Appl. No.: 18/081,834

(22) Filed: Dec. 15, 2022

(65) Prior Publication Data

US 2023/0194699 A1    Jun. 22, 2023

(30) Foreign Application Priority Data

Dec. 21, 2021    (EP) .................................... 21216199

(51) Int. Cl.
    *G01S 13/89*    (2006.01)
(52) U.S. Cl.
    CPC .................................... *G01S 13/89* (2013.01)
(58) Field of Classification Search
    CPC ........... G01S 13/89; G06T 2207/10021; G06T 2207/10028; G06T 7/60; G06T 7/70; G06T 2207/30252; G06T 5/50; G06T 2207/20212; G06V 10/44; G06V 20/58; G01B 11/26
    See application file for complete search history.

(56) References Cited

U.S. PATENT DOCUMENTS

| 11,358,637 B2 * | 6/2022 | Kroeze ................ G05D 1/0212 |
| 11,813,910 B2 * | 11/2023 | Klinger .................. B62D 15/02 |

(Continued)

FOREIGN PATENT DOCUMENTS

| DE | 102016011324 A1 | 3/2018 |
| WO | 2019202317 A1 | 10/2019 |

OTHER PUBLICATIONS

Olutomilayo, K. et al., "Estimation of Trailer-Vehicle Articulation Angle Using 2D Point-Cloud Data," 2019 IEEE Radar Conference (RadarConf), Apr. 22-26, 2019, Boston, MA, USA, IEEE, 6 pages.

(Continued)

*Primary Examiner* — Francis C Gray
(74) *Attorney, Agent, or Firm* — Withrow & Terranova, PLLC

(57) ABSTRACT

A method for determining an articulation angle of a vehicle combination comprising a first vehicle section, such as a truck, and a second vehicle section, such as a trailer or dolly unit, which are connected via a first articulation joint, wherein the first vehicle section comprises an image obtaining device which is configured to obtain images of the second vehicle section during use, the method comprising obtaining a first image of the second vehicle section by the image obtaining device; mirroring the first image, thereby obtaining a second mirrored image; determining the articulation angle between the first and the second vehicle sections based on a required level of relative rotation of the first image and the second mirrored image until the first image and the second mirrored image match each other.

15 Claims, 4 Drawing Sheets

(56) References Cited

U.S. PATENT DOCUMENTS

| | | | | |
|---|---|---|---|---|
| 2014/0085472 A1* | 3/2014 | Lu | ............................ | B60R 1/26 |
| | | | | 348/148 |
| 2016/0048966 A1* | 2/2016 | Kuehnle | ................... | G06T 5/50 |
| | | | | 348/38 |
| 2021/0179172 A1 | 6/2021 | Kroeze et al. | | |
| 2022/0161619 A1* | 5/2022 | Klinger | ................... | B60D 1/62 |
| 2022/0185371 A1* | 6/2022 | Persson | ................. | B62D 12/00 |
| 2023/0096655 A1* | 3/2023 | Persson | ............... | G06V 20/588 |
| | | | | 701/41 |

OTHER PUBLICATIONS

Extended European Search Report for European Patent Application No. 21216199.6, mailed Jun. 3, 2022, 8 pages.

\* cited by examiner

METHOD AND SYSTEM FOR DETERMINING AN ARTICULATION ANGLE OF A VEHICLE COMBINATION

RELATED APPLICATIONS

The present application claims priority to European Patent Application No. 21216199.6, filed on Dec. 21, 2021, and entitled "METHOD AND SYSTEM FOR DETERMINING AN ARTICULATION ANGLE OF A VEHICLE COMBINATION," which is incorporated herein by reference in its entirety.

TECHNICAL FIELD

The disclosure relates to a method for determining an articulation angle of a vehicle combination. The disclosure also relates to a system for determining an articulation angle of a vehicle combination, a vehicle, a computer program, and a computer readable medium.

The invention can be applied in heavy-duty vehicles, such as trucks, buses and construction equipment. Although the invention will be described with respect to a heavy-duty truck, the invention is not restricted to this particular vehicle, but may also be used in other vehicles such as working machines and passenger cars.

BACKGROUND

A vehicle combination typically comprises a towing vehicle and one or more connected trailers. The towing vehicle and the one or more trailers are connected in series via one or more intermediate articulation joints. An articulation joint may be a permanent joint, such as an articulation joint for a dump truck. Alternatively, it may be a disconnectable articulation joint, such as an articulation joint for a truck and trailer combination, e.g. a semi-trailer combination or a so called Nordic combination.

Reversing of a vehicle combination may be a challenging task. It is therefore known to make use of driver assistance systems which are adapted to assist a driver during reversing, such as by providing driving instructions during a reversing manoeuvre. Also more advanced systems, sometimes denoted advanced driver assistance systems (ADAS), have become more common in recent years, especially for heavy-duty vehicle combinations. ADAS may for example take over at least some parts of steering, propulsion and braking during a reversing manoeuvre, thereby reducing the burden of the driver.

For the above systems it may be important to know the articulation angle(s) between two adjacent and connected vehicle sections of the vehicle combination. For example, it is known to control a reversing operation of a vehicle combination based on input about at least one current articulation angle of the vehicle combination.

It is therefore a strive to develop further improved technology in which an articulation angle of a vehicle combination can be efficiently determined.

SUMMARY

In view of the above, an object of the invention is to provide an improved method and/or system for determining an articulation angle of a vehicle combination. In particular, an object of the invention is to provide an improved method and/or system which in an efficient and cost-effective manner determines an articulation angle of a vehicle combination.

According to a first aspect, the object is at least partly achieved by a method. Thus, a method for determining an articulation angle of a vehicle combination comprising a first vehicle section, such as a truck, and a second vehicle section, such as a trailer or dolly unit, which are connected via a first articulation joint is provided. The first vehicle section comprises an image obtaining device which is configured to obtain images of the second vehicle section during use. The method comprises:

obtaining a first image of the second vehicle section by the image obtaining device;

mirroring the first image, thereby obtaining a second mirrored image;

determining the articulation angle between the first and second vehicle sections based on a required level of relative rotation of the first image and the second mirrored image until the first image and the second mirrored image match each other.

A match of two images, as used herein, may also be denoted as an overlap and/or fit where the two images, e.g., as viewed when one of the images is put on top of the other image, coincide with each other. Preferably, the relative rotation of the first image and the second mirrored image corresponds to a rotation with respect to the first articulation joint. The articulation joint as used herein may also be denoted a pivot joint or pivot point. The required level of relative rotation may be a required level of rotation of the first image until the first image matches with the second mirrored image. Alternatively, the required level of relative rotation may be a required level of rotation of the second mirrored image until the second mirrored image matches with the first image.

By the provision of the method as disclosed herein, an improved method is achieved in which the articulation angle can be determined in a fast, reliable and efficient manner, e.g. without the need of using more complicated image analysis algorithms for determining the articulation angle. In particular, the present invention is based on a realization that one image can be mirrored and compared with the original image in order to efficiently determine the articulation angle. This may imply a reduced need of processing power and/or faster determination of the articulation angle. It has further been realized that by the approach of using a mirrored image for the articulation angle determination, the articulation angle may be determined without a need to calibrate the image obtaining device. In the prior art, sensor calibration has been required to reliably determine the articulation angle.

A mirrored image may be defined as a reflection of an image, wherein the image is reversed in a direction being perpendicular to a normal of the image. More particularly, objects, such as the second vehicle section, may appear inverted, typically laterally inverted, in the mirrored image with respect to the image being mirrored. For example, a mirrored image may be regarded as an image which reverses left and right directions. As such, and preferably, the second mirrored image may be obtained by inverting the first image in a direction being perpendicular to a normal of the first image, in which the direction is preferably perpendicular to a height axis of the first image. The height axis of the first image preferably corresponds to a height axis of the vehicle combination, such as a height axis of the first and/or second vehicle section.

Optionally, the first image may be a range image with each pixel of the first image being associated with a distance with respect to the image obtaining device. By knowing the distance associated with each pixel, it may be easier to more precisely determine the articulation angle. For example, by knowing the distance associated with each pixel, an offset between the location of the image obtaining device and the first articulation joint can be determined, and this may be used to more precisely determine the articulation angle.

Optionally, the relative rotation may correspond to a rotation about a height axis of the vehicle combination which intersects the first articulation joint, wherein the height axis of the vehicle combination extends in a height direction of the vehicle combination. The height axis may for example be a height axis of the first vehicle section and/or a height axis of the second vehicle section. Furthermore, the height axis typically corresponds to a vertical axis when the vehicle combination is provided on a flat horizontally extending surface.

Still optionally, the first image may be mirrored with respect to a plane defined by the height axis and a mid-longitudinal axis of the first vehicle section, wherein the mid-longitudinal axis intersects the first articulation joint. This may imply an increased precision of the articulation angle determination.

Optionally, the articulation angle may be determined based on an assumption that a height axis and a mid-longitudinal axis of the second vehicle section which intersects the articulation joint defines a symmetry plane for the second vehicle section, wherein the height axis of the second vehicle section extends in a height direction of the second vehicle section. The longitudinal axis extends in a longitudinal direction of the second vehicle section, corresponding to a travel direction of the second vehicle section. Typically, a trailer is symmetrical, or at least substantially symmetrical, with respect to the aforementioned symmetry plane. Accordingly, it has been realized that by use of the aforementioned symmetry assumption, a match between the second mirrored image and the first image can be more easily determined.

Optionally, determining the articulation angle between the first and second vehicle sections may comprise identifying at least one tracking portion on the second vehicle section in the first image and identifying the at least one tracking portion on the second vehicle section in the second mirrored image, wherein the first image and the second mirrored image are considered to be matched when the at least one tracking portion in the first image coincides with the at least one tracking portion in the second mirrored image. Using one or more tracking portions to determine a match between the first image and the second mirrored image may imply less required processing power for the articulation angle determination, thereby also implying a faster and more efficient articulation angle determination. A tracking portion may be defined as a portion of the second vehicle section which has a specific characteristic which can be identified and tracked in the first image and in the second mirrored image.

Still optionally, determining the articulation angle between the first and second vehicle sections may comprise identifying a first and a second tracking portion of the second vehicle section in the first image and identifying the first and second tracking portions of the second vehicle section in the second mirrored image, wherein the first and second tracking portions are provided on respective sides of the symmetry plane, and wherein the first image and the second mirrored image are considered to be matched when the respective first and second tracking portions in the first image coincides with the respective first and second tracking portions in the second mirrored image. Thereby, a more reliable articulation angle determination may be achieved.

Optionally, the at least one tracking portion may be any one of a trailer support leg or a pair of trailer support legs, a chassis portion, such as longitudinally and/or transversely extending support bars, one or more drive-under-trailer-protection-frames and ground engaging means, such as wheels.

Preferably, the determined articulation angle corresponds to half the required level of relative rotation.

Optionally, the vehicle combination may comprise more than one articulation joint for connecting at least three vehicle sections to each other. As such, the method may further comprise determining the articulation angle of each one of the more than one articulation joints by use of any one of the embodiments of the method as disclosed herein.

Still optionally, the method may also comprise determining a position of each one of the one or more articulation joints with respect to a position of the image obtaining device. Thereby, for each articulation joint, an obtained image and the corresponding mirrored image can be relatively rotated with respect to the position of the respective articulation joint. As such, each articulation angle can be determined with high precision in a fast and efficient manner.

For example, the vehicle combination with the more than one articulation joint may comprise a first vehicle section, such as a truck, which is connected to a dolly unit via a first articulation joint, and wherein the dolly unit is connected to a trailer via a second articulation joint.

According to a second aspect of the invention, the object is at least partly achieved by a system. Thus, a system for determining an articulation angle of a vehicle combination comprising a first vehicle section, such as a truck, and a second vehicle section, such as a trailer or dolly unit, which are connected via a first articulation joint is provided. The system comprises an image obtaining device which is provided on the first vehicle section and configured to obtain images of the second vehicle section during use. The system comprises a processing unit which is configured to:
  obtain a first image of the second vehicle section by the image obtaining device;
  mirror the first image, thereby obtaining a second mirrored image;
  determine the articulation angle between the first and second vehicle sections based on a required level of relative rotation of the first image and the second mirrored image until the first image and the second mirrored image match each other.

Advantages and effects of the second aspect of the invention appear from the advantages and effects of the first aspect of the invention. It shall be noted that all embodiments of the first aspect are combinable with all embodiments of the second aspect, and vice versa.

Optionally, the image obtaining device may be provided offset from the mid-longitudinal axis of the first vehicle section which intersects the first articulation joint, such as transversely offset and/or located above or below the first articulation joint. The mid-longitudinal axis of the first vehicle section extends in a longitudinal direction and intersects the first articulation joint, and corresponds to a travel direction of the first vehicle section.

Optionally, the image obtaining device may be any one of a light detection and ranging (LIDAR) sensor, a radio detection and ranging (RADAR) sensor, a sound navigation and ranging (SONAR) sensor and a camera, such as a stereo camera, a mono camera and a time-of-flight camera. Preferably, the image obtaining device is configured to obtain a range image with each pixel of the range image being associated with a distance with respect to the image obtaining device.

According to a third aspect of the invention, the object is at least partly achieved by a vehicle. Thus, a vehicle comprising the system according to any one of the embodiments of the second aspect is provided.

According to a fourth aspect of the invention, the object is at least partly achieved by a computer program. Thus, a computer program comprising program code means for performing the steps of any one of the embodiments of the first aspect of the invention when said program is run on a computer is provided. The computer may be the processing unit of the system according to any one of the embodiments of the second aspect.

According to a fifth aspect, the object is at least partly achieved by a computer readable medium. Thus, a computer readable medium carrying a computer program comprising program code means for performing the steps of any of the embodiments of the first aspect when said program product is run on a computer is provided. The computer may be the processing unit of the system according to any one of the embodiments of the second aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

Figure 1:
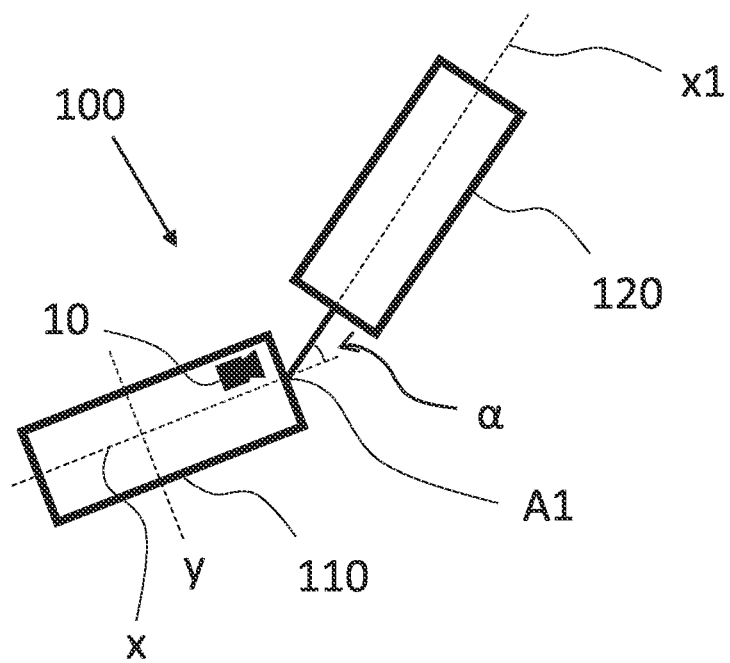
FIG. 1 is a schematic view from above of a vehicle combination according to an example embodiment of the invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

FIG. 1 depicts a vehicle combination 100 according to an example embodiment of the invention. The vehicle combination 100 comprises a first vehicle section 110 and a second vehicle section 120 which are connected via a first articulation joint A1. The first vehicle section 110 is herein a truck, and the second vehicle section 120 is a trailer. Moreover, the first vehicle section 110 comprises an image obtaining device 10 which is configured to obtain images of the second vehicle section 120 during use, e.g., during operation of the vehicle combination 100. The image obtaining device 10 may obtain images when the vehicle combination 100 is moving, but also when it is standing still, i.e., at zero vehicle speed. The vehicle combination 100 may be any type of vehicle combination as e.g., mentioned in the above. However, it has been realized that the present invention is especially advantageous for vehicle combinations 100 comprising driver assistance systems, such as ADAS, for assisting in reversing the vehicle combination 100.

In the shown state, the vehicle combination 100 has a certain pose resulting in an articulation angle $\alpha$. The articulation angle $\alpha$ is here defined as an angle difference between a mid-longitudinal axis x of the first vehicle section 110 and a mid-longitudinal axis x1 of the second vehicle section 120. The mid-longitudinal axes x, x1 intersect the first articulation joint A1. Accordingly, when the vehicle combination 100 is in a straight state, the angle difference $\alpha$ will be zero.

Figure 2:
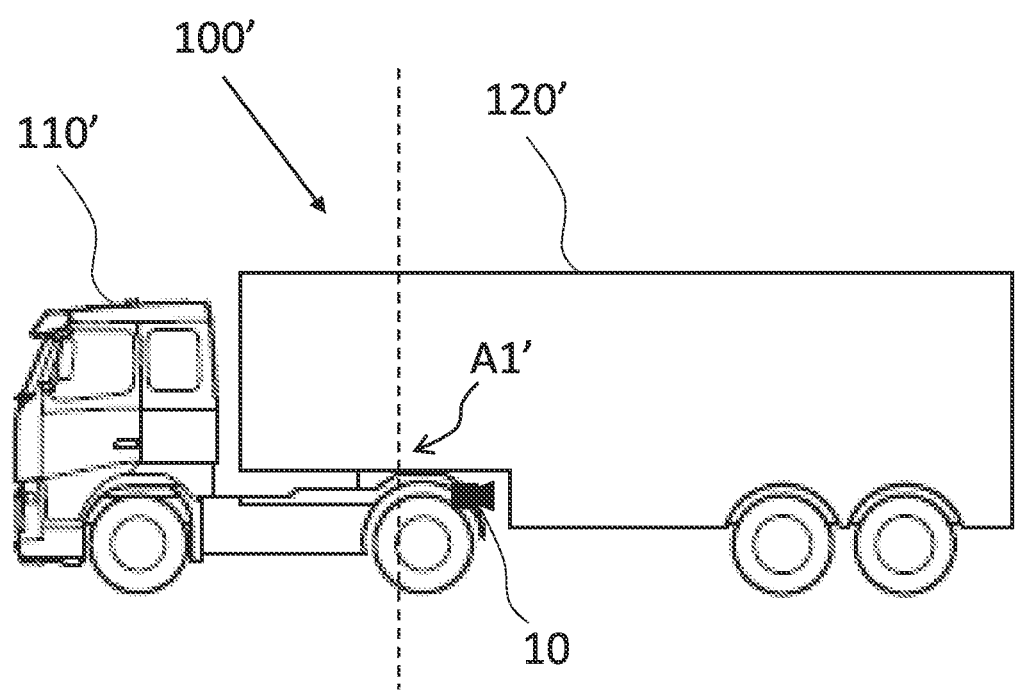
FIG. 2 is a side view of a vehicle combination according to another embodiment of the invention.

FIG. 2 depicts a side view of an alternative vehicle combination 100' according to an example embodiment of the present invention. The vehicle combination 100' comprises a first vehicle section 110' and a second vehicle section 120' which are connected via a first articulation joint A1'. This vehicle combination 100' is a heavy-duty truck and trailer combination comprising a towing truck 110' and a semi-trailer 120'. The articulation joint A1' is here provided by a kingpin (not shown) of the semi-trailer 120' and by a so called fifth wheel (not shown) of the towing truck 110'. It shall however be understood that the present invention is not limited to this type of connection, i.e., any other type of disconnectable or permanent connection may be used.

The towing truck 110' comprises an image obtaining device 10, which is herein located below and behind the articulation joint A1', as seen with respect to a forward travelling direction of the vehicle combination 100'.

Referring especially to FIGS. 1, 3a-3c and 5, a method according to an example embodiment of the present invention will now be described.

Accordingly, a method for determining an articulation angle $\alpha$ of a vehicle combination 100 comprising a first vehicle section 110, such as a truck, and a second vehicle section 120, such as a trailer or dolly unit, is provided.

The method comprises:

S1: obtaining a first image P1 of the second vehicle section 120 by the image obtaining device 10.

Figure 3A:
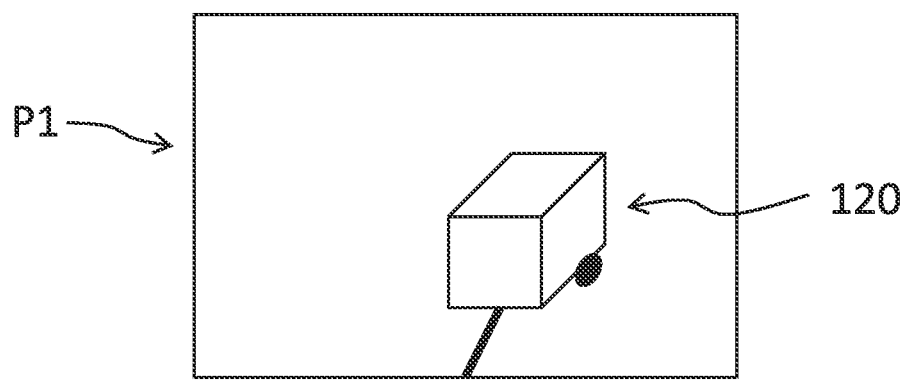
FIGS. 3a-c show images obtained by a method according to an example embodiment of the invention.

FIG. 3a depicts an example of the first image P1, i.e., the first image P1 depicts the second vehicle section 120.

The image obtaining device 10 as shown in FIGS. 1 and 2 may for example be a camera, such as a stereo camera, or any other type of image obtaining device as e.g., disclosed herein.

The method further comprises:

S2: mirroring the first image P1, thereby obtaining a second mirrored image P1M.

Figure 3B:
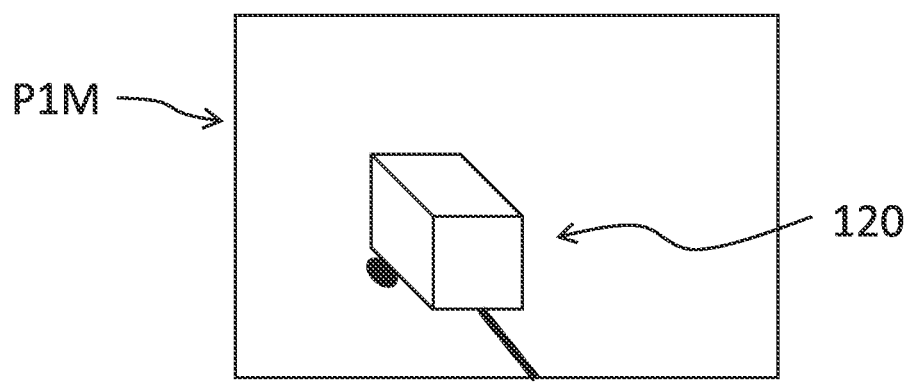

FIG. 3b depicts an example of the second mirrored image P1M.

The second mirrored image P1M is reversed, or inversed, in a direction being perpendicular to a normal of the first image P1. Preferably, as shown, the first image P1 is mirrored by being reversed in a lateral direction, in this case in the lateral direction y which is perpendicular to the travel direction x of the first vehicle section 110, see FIG. 1.

The method further comprises:

S3: determining the articulation angle α between the first and second vehicle sections 110, 120 based on a required level of relative rotation Φ' of the first image P1 and the second mirrored image P1M until the first image P1 and the second mirrored image P1M match each other.

Figure 3C:
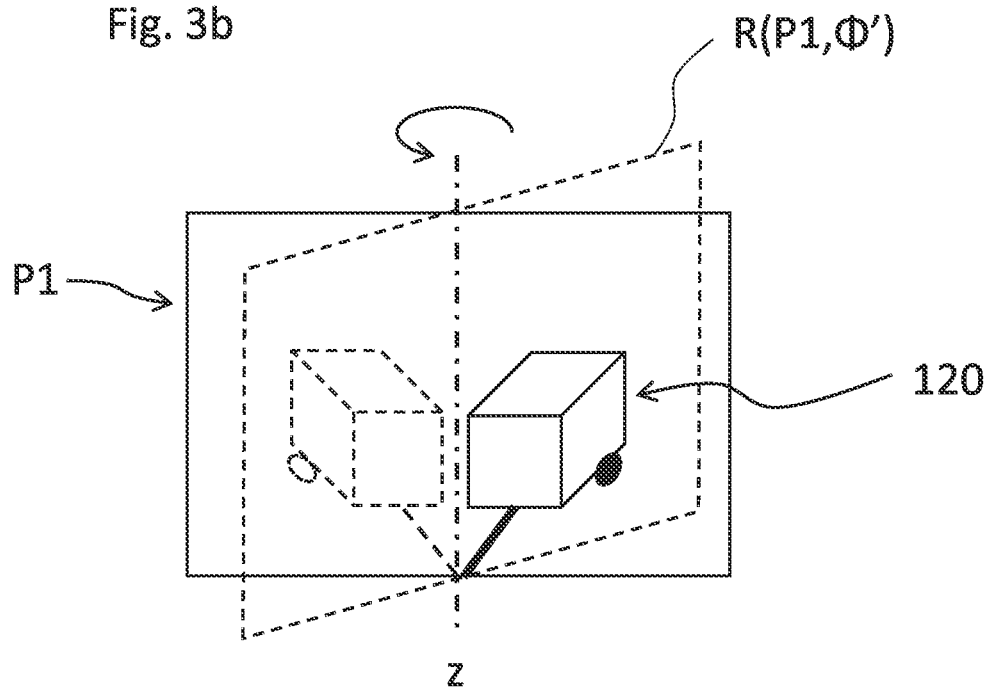

FIG. 3c depicts an example where the first image P1 is rotated with respect to a z-axis (indicated by an arrow around the z-axis), Φ' degrees until it matches with the second mirrored image P1M as shown in FIG. 3b. In this case the match occurs when the first image P1 has been rotated as shown by the dashed image R (P1, Φ') in FIG. 3c. The z-axis does here correspond to a height axis of the vehicle combination 100 as shown in FIG. 1. More particularly, in the shown embodiment, the first image P1 is mirrored with respect to a plane defined by the height axis z and a mid-longitudinal axis x of the first vehicle section 110, wherein the mid-longitudinal axis x intersects the first articulation joint A1.

Accordingly, the relative rotation Φ' may as shown in FIG. 3c correspond to a rotation about a height axis z of the vehicle combination 100 which intersects the first articulation joint A1, wherein the height axis z of the first vehicle combination 100 extends in a height direction of the vehicle combination 100.

The first image P1 is preferably a range image with each pixel of the first image P1 being associated with a distance with respect to the image obtaining device 10.

Moreover, the articulation angle α may be determined based on an assumption that a height axis and the mid-longitudinal axis x1 of the second vehicle section 120 which intersects the articulation joint A1 defines a symmetry plane for the second vehicle section 120, wherein the height axis of the second vehicle section 120 extends in a height direction of the second vehicle section 120. The assumption implies facilitated matching of the first image P1 and the second mirrored image P1M.

FIGS. 4a-f depict two-dimensional views intended to illustrate embodiments of the inventive concept. The coordinate system defined by the lines $y_p$ and $x_p$ refer to lateral and longitudinal directions, respectively, of images obtained by the image obtaining device 10. In other words, the longitudinal direction $x_p$ relates to image depth. Furthermore, in the shown embodiments, the lateral direction $y_p$ does here correspond to the lateral direction y of the first vehicle section 110.

Figures 4A, 4B:
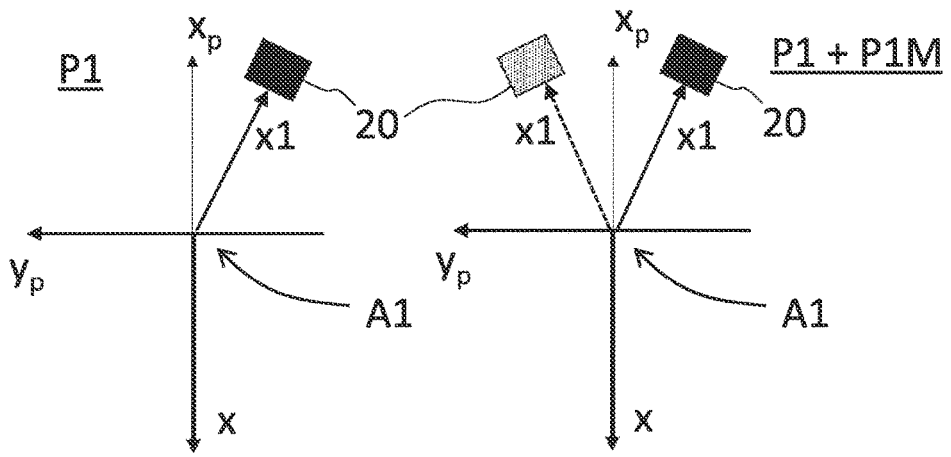
FIGS. 4a-f show two-dimensional views which illustrate at least two embodiments of a method according to the present invention.

The black box illustrates a tracking portion 20 of the second vehicle section 120 according to an embodiment of the invention. In addition, the grey box as e.g., shown in FIG. 4b illustrates the tracking portion 20 as seen in the second mirrored image P1M. As such, FIGS. 4a and c are two-dimensional views to illustrate a first image P1 according to two example embodiments. Furthermore, FIGS. 4b, d, e and f are two-dimensional views to illustrate the first image P1 and the second mirrored Image P1M according to two example embodiments. More particularly, FIGS. 4b, d, e and f may be seen to represent the two images P1 and P1M when they are provided "on top of each other".

FIGS. 4a-f further show the mid-longitudinal axis x of the first vehicle section 110, the mid-longitudinal axis x1 of the second vehicle section 120 and the first articulation joint A1.

In view of e.g., FIGS. 4a and b, determining the articulation angle α between the first and second vehicle sections 110, 120 may comprise identifying at least one tracking portion 20 on the second vehicle section 120 in the first image P1 and identifying the at least one tracking portion 20 on the second vehicle section 120 in the second mirrored image P1M.

The first image P1 and the second mirrored image P1M are considered to be matched when the at least one tracking portion 20 in the first image P1 coincides with the at least one tracking portion 20 in the second mirrored image P1M. This is illustrated in FIG. 4f, showing a required level of relative rotation Φ' of the first image P1 and the second mirrored image P1M until the first image P1 and the second mirrored image P1M match each other. The determined articulation angle α corresponds to half the required level of relative rotation Φ'.

The at least one tracking portion 20 may be two separate tracking portions, i.e., the black and grey boxes may represent two tracking portions, wherein the first and second tracking portions 20 are provided on respective sides of the symmetry plane as mentioned in the above, i.e., the plane which is defined by the height axis z and the mid-longitudinal axis x1 of the second vehicle section 120. For example, the first and second tracking portions 20 may be a pair of trailer support legs, a pair of drive-under-trailer-protection-frames, or any other pair of symmetrical tracking portions of the second vehicle section 120.

Figures 4C, 4D, 4E:
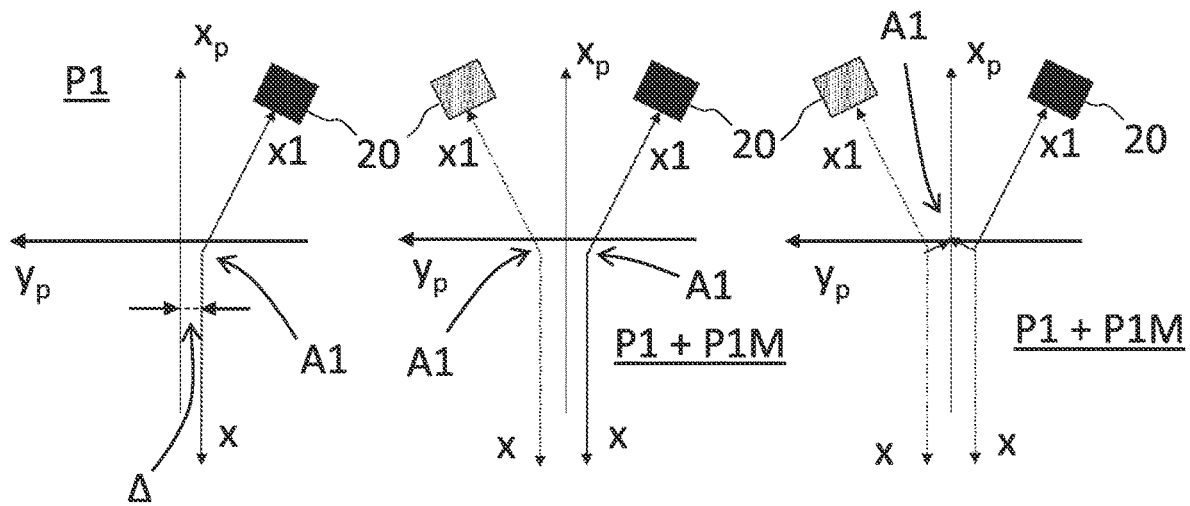
Figure 4F:
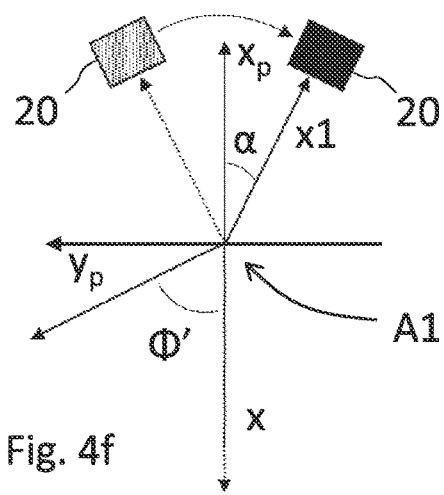
Figure 5:
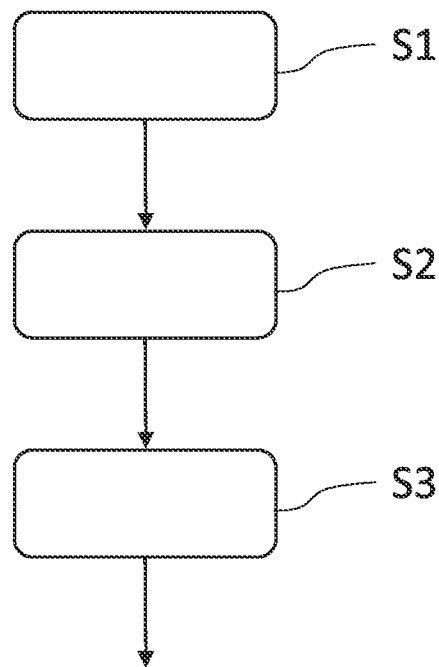
FIG. 5 shows a flowchart of a method according to an example embodiment of the invention.

FIGS. 4c-e depict an alternative embodiment where the image obtaining device 10 is provided transversely, i.e., laterally, offset from the mid-longitudinal axis x of the first vehicle section 110 which intersects the first articulation joint A1. As shown in FIG. 4c, the image obtaining device 10 is provided transversely offset by a lateral distance Δ. As shown in FIG. 4d, the offset may also be noted in the second mirrored image P1M. As such, according to an embodiment, and as illustrated in FIG. 4e by two arrows, the method may further comprise compensating for the offset so that the relative rotation corresponds to a relative rotation with respect to the height axis z of the vehicle combination 100 which intersects the first articulation joint A1. Accordingly, by the compensation, the relative rotation may be performed as indicated in FIG. 4f. For example, the compensation of the offset Δ may be performed before and/or after the relative rotation of the two images P1, P1M.

It has been realized that the location of the image obtaining device 10 is preferably offset from the mid-longitudinal axis x of the first vehicle section 110 which intersects the first articulation joint A1, such as transversely offset and/or located above or below the first articulation joint A1. Thereby it may be easier to obtain high quality images of the second vehicle section 120 without interfering with the articulation joint A1.

Figure 6:
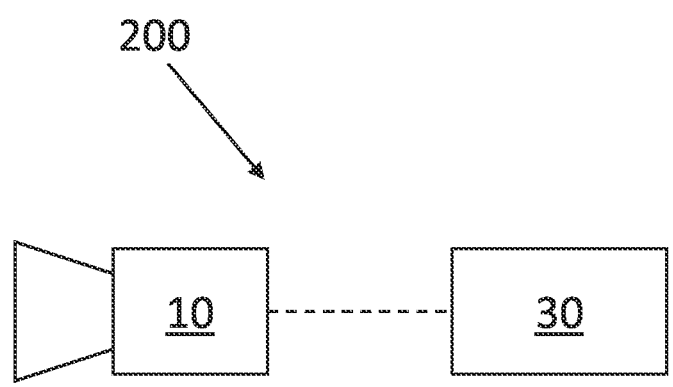
FIG. 6 depicts a system according to an embodiment of the present invention.

FIG. 6 depicts a system 200 according to an example embodiment for determining an articulation angle α of e.g., the vehicle combination 100 as shown in FIG. 1 or the vehicle combination 100' as shown in FIG. 2. The system 200 comprises an image obtaining device 10 which is intended to be provided on the first vehicle section 110 and configured to obtain images of the second vehicle section 120 during use. The system 200 further comprises a processing unit 30 which is configured to:

obtain a first image P1 of the second vehicle section 120 by the image obtaining device 10;

mirror the first image P1, thereby obtaining a second mirrored image P1M;

determine the articulation angle α between the first and second vehicle sections 110, 120 based on a required level of relative rotation Φ' of the first image P1 and the second mirrored image P1M until the first image P1 and the second mirrored image P1M match each other.

The processing unit 30 may be any type of electronic processing unit which can perform the method as disclosed herein. Typically, the processing unit 30 comprises processing circuitry and a memory unit which stores a computer program according to an example embodiment of the present invention. The processing unit 30 may in an embodiment be denoted a computer. It shall also be noted that the processing unit 30 may not necessarily be one single unit but may alternatively be formed by more than one sub-processing units. Furthermore, even though the processing unit 30 is preferably located on the first vehicle section 110, 110', in an alternative embodiment it may be a remote unit off-board the first vehicle section 110, 110'. The processing unit 30 may communicate with the image obtaining device 10 by use of wired and/or wireless communication means. The processing unit 30 is preferably also communicatively connected to other units, such as to any other control unit of the first vehicle section 110, 110'. Preferably, the processing unit is in communicative contact with an ADAS of the first vehicle section 110, 110', or alternatively the processing unit 30 also comprises ADAS functionality.

It is to be understood that the present invention is not limited to the embodiments described above and illustrated in the drawings; rather, the skilled person will recognize that many changes and modifications may be made within the scope of the appended claims.

The invention claimed is:

1. A method for determining an articulation angle of a vehicle combination comprising a first vehicle section, such as a truck, and a second vehicle section, such as a trailer or dolly unit, which are connected via a first articulation joint, wherein the first vehicle section comprises an image obtaining device which is configured to obtain images of the second vehicle section during use, the method comprising:
   obtaining a first image of the second vehicle section by the image obtaining device;
   mirroring the first image, thereby obtaining a second mirrored image; and
   determining the articulation angle between the first and the second vehicle sections based on a required level of relative rotation of the first image and the second mirrored image until the first image and the second mirrored image match each other.

2. The method of claim 1, wherein the first image is a range image with each pixel of the first image being associated with a distance with respect to the image obtaining device.

3. The method of claim 1, wherein the relative rotation corresponds to a rotation about a height axis of the vehicle combination which intersects the first articulation joint, wherein the height axis of the first vehicle combination extends in a height direction of the vehicle combination.

4. The method of claim 1, wherein the first image is mirrored with respect to a plane defined by the height axis and a mid-longitudinal axis of the first vehicle section, wherein the mid-longitudinal axis intersects the first articulation joint.

5. The method of claim 1, wherein the articulation angle is determined based on an assumption that a height axis and a mid-longitudinal axis of the second vehicle section which intersects the articulation joint defines a symmetry plane for the second vehicle section, wherein the height axis of the second vehicle section extends in a height direction of the second vehicle section.

6. The method of claim 1, wherein determining the articulation angle between the first and the second vehicle sections comprises identifying at least one tracking portion on the second vehicle section in the first image and identifying the at least one tracking portion on the second vehicle section in the second mirrored image, wherein the first image and the second mirrored image are considered to be matched when the at least one tracking portion in the first image coincides with the at least one tracking portion in the second mirrored image.

7. The method of claim 5, wherein determining the articulation angle between the first and the second vehicle sections comprises identifying a first and a second tracking portion of the second vehicle section in the first image and identifying the first and the second tracking portions of the second vehicle section in the second mirrored image, wherein the first and the second tracking portions are provided on respective sides of the symmetry plane, and wherein the first image and the second mirrored image are considered to be matched when the respective first and second tracking portions in the first image coincide with the respective first and second tracking portions in the second mirrored image.

8. The method of claim 6, wherein the at least one tracking portion is any one of a trailer support leg or a pair of trailer support legs, a chassis portion, such as longitudinally and/or transversely extending support bars, one or more drive-under-trailer-protection-frames and ground engaging means, such as wheels.

9. The method of claim 1, wherein the determined articulation angle corresponds to half the required level of relative rotation.

10. A system for determining an articulation angle of a vehicle combination comprising a first vehicle section, such as a truck, and a second vehicle section, such as a trailer or dolly unit, which are connected via a first articulation joint, wherein the system comprises an image obtaining device which is provided on the first vehicle section and configured to obtain images of the second vehicle section during use, wherein the system comprises a processing unit which is configured to:
   obtain a first image of the second vehicle section by the image obtaining device;
   mirror the first image, thereby obtaining a second mirrored image; and
   determine the articulation angle between the first and the second vehicle sections based on a required level of relative rotation of the first image and the second mirrored image until the first image and the second mirrored image match each other.

11. The system of claim 10, wherein the image obtaining device is provided offset from the mid-longitudinal axis of the first vehicle section which intersects the first articulation joint, such as transversely offset and/or located above or below the first articulation joint.

12. The system of claim 10, wherein the image obtaining device is any one of a LIDAR, a RADAR, a SONAR and a camera, such as a stereo camera, a mono camera and a time-of-flight camera.

13. A vehicle comprising the system of claim 10.

14. A computer program comprising program code means for performing the steps of claim 1 when the program is run on a computer, such as on the processing unit of a system for determining an articulation angle of a vehicle combination comprising a first vehicle section, such as a truck, and a second vehicle section, such as a trailer or dolly unit, which are connected via a first articulation joint, wherein the system comprises an image obtaining device which is provided on the first vehicle section and configured to obtain images of the second vehicle section during use, wherein the system comprises a processing unit which is configured to:

obtain a first image of the second vehicle section by the image obtaining device;

mirror the first image, thereby obtaining a second mirrored image; and determine the articulation angle between the first and the second vehicle sections based on a required level of relative rotation of the first image and the second mirrored image until the first image and the second mirrored image match each other.

15. A computer readable medium carrying a computer program comprising program code means for performing the steps of claim 1 when the program product is run on a computer, such as on the processing unit of a system for determining an articulation angle of a vehicle combination comprising a first vehicle section, such as a truck, and a second vehicle section, such as a trailer or dolly unit, which are connected via a first articulation joint, wherein the system comprises an image obtaining device which is provided on the first vehicle section and configured to obtain images of the second vehicle section during use, wherein the system comprises a processing unit which is configured to:

obtain a first image of the second vehicle section by the image obtaining device;

mirror the first image, thereby obtaining a second mirrored image; and determine the articulation angle between the first and the second vehicle sections based on a required level of relative rotation of the first image and the second mirrored image until the first image and the second mirrored image match each other.

* * * * *